(12) United States Patent
Tanaka

(10) Patent No.: US 8,824,839 B2
(45) Date of Patent: Sep. 2, 2014

(54) OPTICAL COUPLING DEVICE AND METHOD OF IMPLEMENTING OPTICAL COUPLING DEVICE

(75) Inventor: Yoshinori Tanaka, Hino (JP)

(73) Assignee: Olympus Corporation, Tokyo (JP)

( * ) Notice: Subject to any disclaimer, the term of this patent is extended or adjusted under 35 U.S.C. 154(b) by 751 days.

(21) Appl. No.: 13/149,095

(22) Filed: May 31, 2011

(65) Prior Publication Data

US 2011/0293220 A1     Dec. 1, 2011

(30) Foreign Application Priority Data

Jun. 1, 2010    (JP) ................................ 2010-126187

(51) Int. Cl.
| | | |
|---|---|---|
| G02B 6/26 | (2006.01) | |
| G02B 6/42 | (2006.01) | |
| B23P 11/00 | (2006.01) | |

(52) U.S. Cl.
USPC .................. 385/31; 385/27; 385/39; 385/49; 385/51; 29/446

(58) Field of Classification Search
USPC ...................... 385/27, 31, 39, 49, 51, 52, 147
See application file for complete search history.

(56) References Cited

U.S. PATENT DOCUMENTS

| | | | | |
|---|---|---|---|---|
| 6,226,091 B1* | 5/2001 | Cryan | ........................... | 356/477 |
| 6,278,818 B1* | 8/2001 | Laming et al. | .................. | 385/37 |
| 6,536,959 B2* | 3/2003 | Kuhn et al. | ...................... | 385/93 |
| 8,337,400 B2* | 12/2012 | Mizuyoshi | ..................... | 600/178 |
| 8,506,478 B2* | 8/2013 | Mizuyoshi | ..................... | 600/178 |
| 2001/0004414 A1* | 6/2001 | Kuhn et al. | ...................... | 385/93 |
| 2002/0003926 A1* | 1/2002 | Enomoto et al. | ................. | 385/37 |
| 2009/0306478 A1* | 12/2009 | Mizuyoshi | ..................... | 600/178 |
| 2011/0293220 A1* | 12/2011 | Tanaka | ............................ | 385/39 |
| 2012/0018082 A1* | 1/2012 | Kuboi et al. | .................. | 156/166 |

FOREIGN PATENT DOCUMENTS

JP      2008-76798      4/2008

* cited by examiner

*Primary Examiner* — Akm Enayet Ullah
(74) *Attorney, Agent, or Firm* — Scully, Scott, Murphy & Presser, P.C.

(57) ABSTRACT

An optical coupling device includes an optical fiber holder configured to hold an optical fiber, a wavelength conversion member including a phosphor and an optical characteristic matching member and a wavelength conversion member holder configured to hold the wavelength conversion member. The optical coupling device includes a first region which is formed on an end face of the optical fiber and an end face of the wavelength conversion member, which are optically coupled, when bonding the optical fiber holder and the wavelength conversion member holder, and in which foreign bodies that shield the laser beam are removed from an optical axis of the optical fiber and an optical axis of the wavelength conversion member and a second region which is formed outside the first region when bonding the optical fiber holder and the wavelength conversion member holder, and in which the foreign bodies removed from the first region flow.

16 Claims, 4 Drawing Sheets

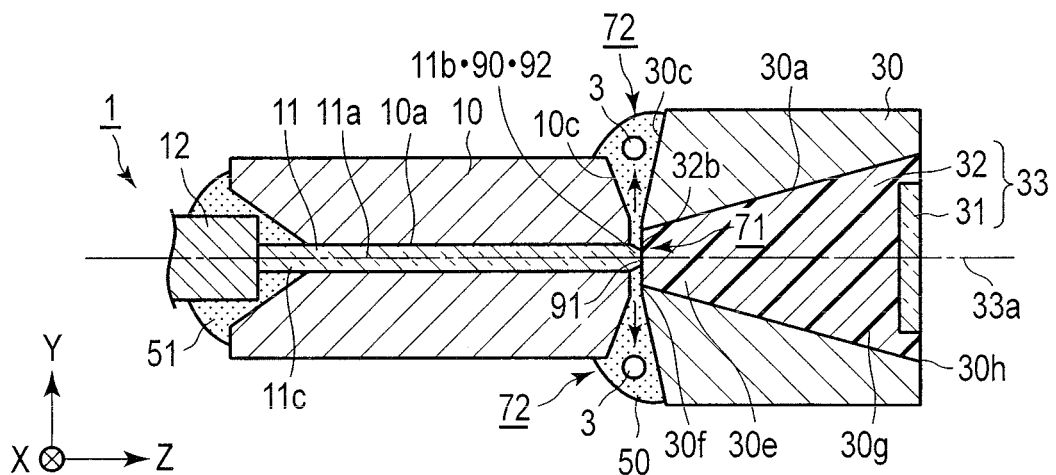
F I G. 4
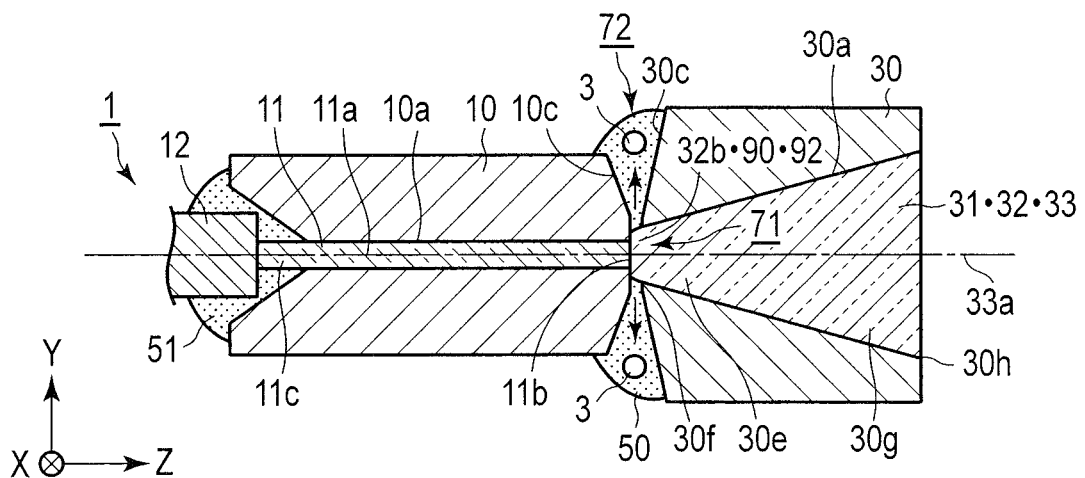
F I G. 5

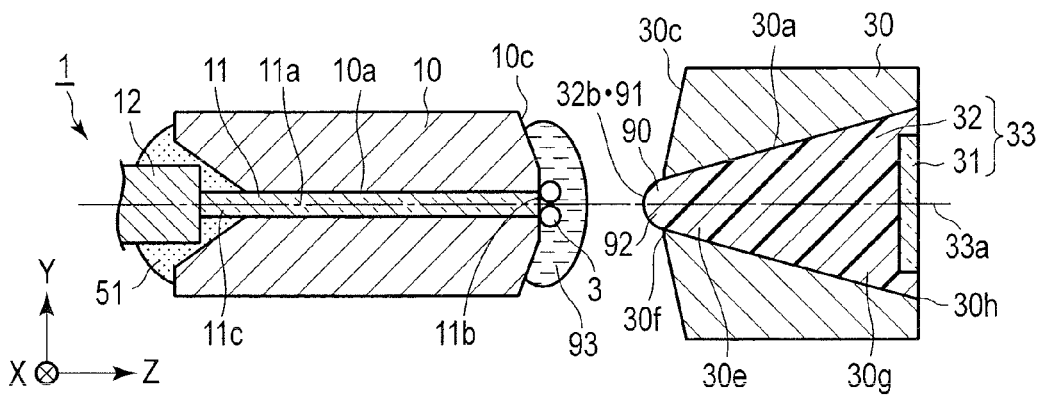
F I G. 6A
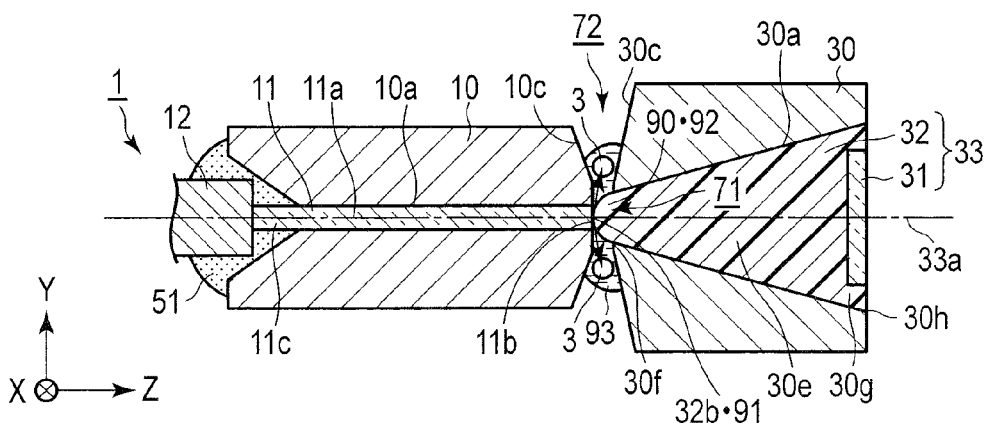
F I G. 6B
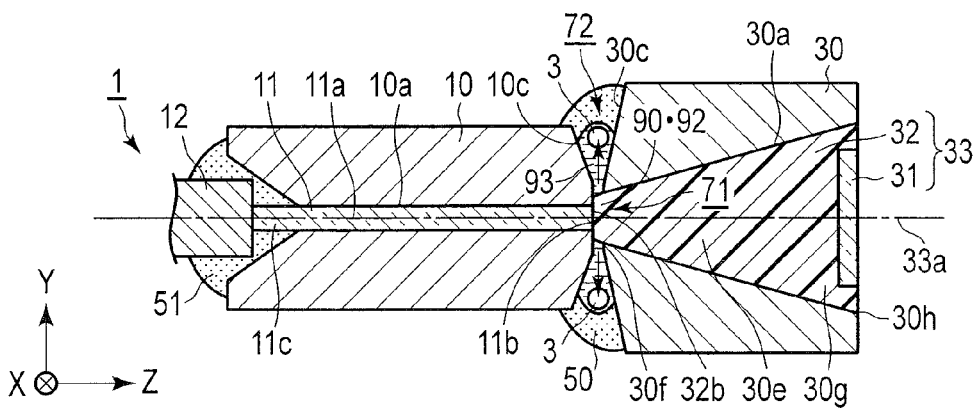
F I G. 6C

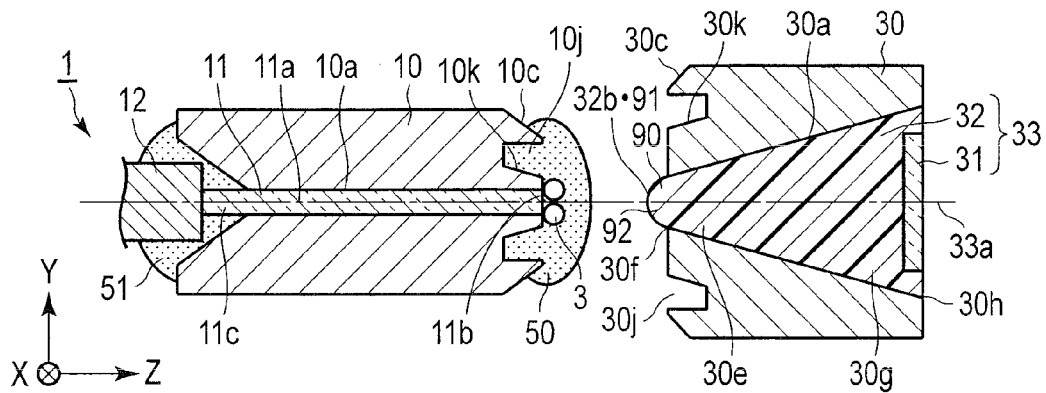
F I G. 7
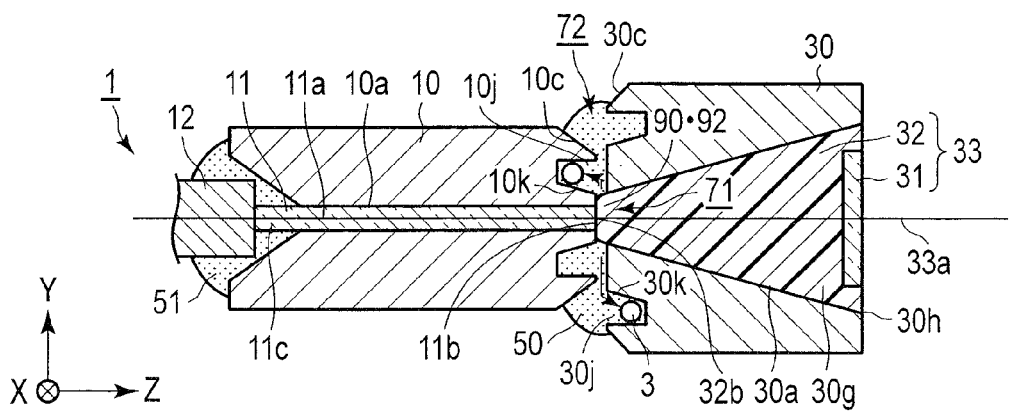
F I G. 8
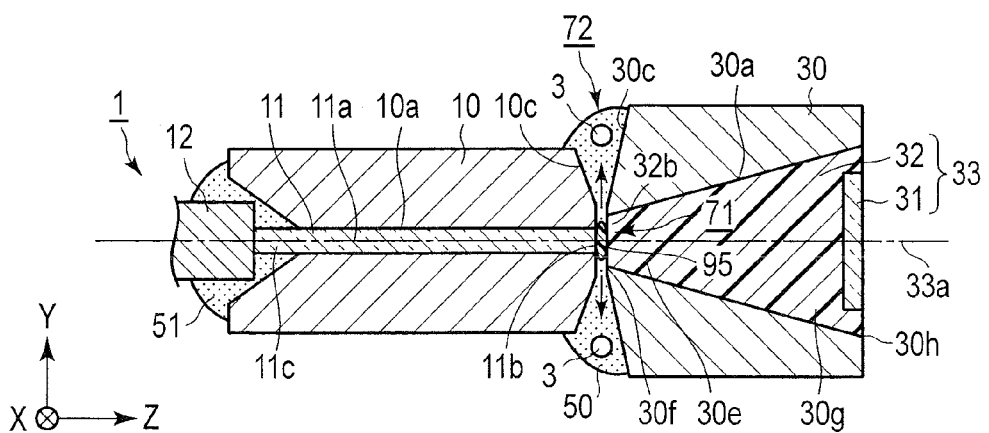
F I G. 9

OPTICAL COUPLING DEVICE AND METHOD OF IMPLEMENTING OPTICAL COUPLING DEVICE

CROSS-REFERENCE TO RELATED APPLICATIONS

This application is based upon and claims the benefit of priority from prior Japanese Patent Application No. 2010-126187, filed Jun. 1, 2010, the entire contents of which are incorporated herein by reference.

BACKGROUND OF THE INVENTION

1. Field of the Invention

The present invention relates to an optical coupling device and a method of implementing an optical coupling device.

2. Description of the Related Art

For example, Jpn. Pat. Appln. KOKAI Publication No. 2008-76798 discloses a new optical component attachable to an end of an optical fiber holding member and a light-emitting device using the optical component.

The optical component includes an optical fiber, an optical fiber holding member that holds the optical fiber, a light conversion member, and a cap having inner holes capable of receiving the optical fiber holding member and the light conversion member.

In Jpn. Pat. Appln. KOKAI Publication No. 2008 76798, a foreign bodies remains an optical axis of the optical fiber. The foreign bodies remain without being removed upon assembling the optical component. The foreign bodies are, for example, chips resulted from at least one of the optical fiber and the light conversion member rubbed against each other when being optically coupled.

Even if the foreign bodies remain optical axis including an end face of the optical fiber and an end face of the light conversion member, the foreign bodies is shielded the laser beam, the light amount loss resulted.

BRIEF SUMMARY OF THE INVENTION

The present invention has been achieved in view of the above-described circumstances, and it is an object of the present invention to provide an optical coupling device and a method of implementing an optical coupling device which is suppressed the light amount loss.

According to an aspect of embodiments, an optical coupling device comprising: an optical fiber holder configured to hold an optical fiber; a wavelength conversion member including a phosphor and an optical characteristic matching member that matches optical characteristics of the phosphor to desired optical characteristics and configured to convert a wavelength of a laser beam that has passed through the optical fiber and enters the wavelength conversion member into a desired wavelength; a wavelength conversion member holder configured to hold the wavelength conversion member, and to bond the optical fiber holder so as to the optical fiber and the wavelength conversion member are optically couple each other, a first region which is formed on an end face of the optical fiber and an end face of the wavelength conversion member, which are optically coupled, when bonding the optical fiber holder and the wavelength conversion member holder, and in which foreign bodies that shield the laser beam are removed from an optical axis of the optical fiber and an optical axis of the wavelength conversion member; and a second region which is formed outside the first region when bonding the optical fiber holder and the wavelength conversion member holder, and in which the foreign bodies removed from the first region flow.

According to an aspect of embodiments, a method of implementing an optical coupling device which includes: an optical fiber holder configured to hold an optical fiber; a wavelength conversion member including a phosphor and an optical characteristic matching member that matches optical characteristics of the phosphor to desired optical characteristics and configured to convert a wavelength of a laser beam that has passed through the optical fiber and enters the wavelength conversion member into a desired wavelength; and a wavelength conversion member holder configured to hold the wavelength conversion member, and optically couples the optical fiber with the wavelength conversion member when bonding the optical fiber holder and the wavelength conversion member holder, the method comprising: relatively adjusting the wavelength conversion member holder and the optical fiber holder in position so as to arrange an optical axis of the optical fiber and an optical axis of the wavelength conversion member in a straight line; pressing one of the optical fiber holder and the wavelength conversion member holder against the other so as to push one of an end face of the optical fiber and an end face of the wavelength conversion member against the other; forming a first region by the pressing, where foreign bodies that shield the laser beam are removed from the optical axis of the optical fiber and the optical axis of the wavelength conversion member; and forming a second region by the pressing, where the foreign bodies removed from the first region flow.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view showing an assembled optical coupling device according to the first modification of the first embodiment;

FIG. 5 is a view showing an assembled optical coupling device according to the second modification of the first embodiment;

FIG. 6A is a view showing assembling an optical coupling device according to the third modification of the first embodiment;

FIG. 6B is a view showing assembling the optical coupling device shown in FIG. 6A according to the third modification of the first embodiment;

FIG. 6C is a view showing the assembled optical coupling device shown in FIGS. 6A and 6B according to the third modification of the first embodiment;

FIG. 7 is a view showing assembling an optical coupling device according to the second embodiment of the present invention;

FIG. 8 is a view showing the assembled optical coupling device shown in FIG. 7; and FIG. 9 is a view showing an assembled optical coupling device according to the third embodiment of the present invention.

DETAILED DESCRIPTION OF THE INVENTION

Figure 1:
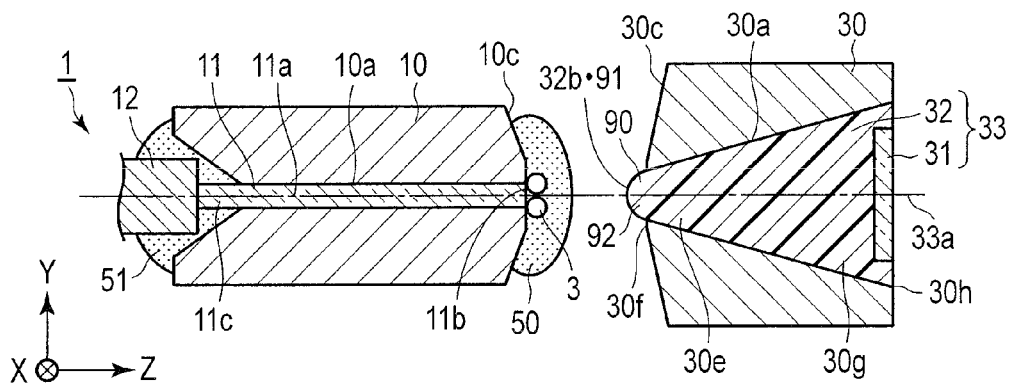
FIG. 1 is a view showing assembling an optical coupling device according to the first embodiment of the present invention.

The embodiments of the present invention will now be described in detail with reference to the accompanying drawing.

The first embodiment will be described with reference to FIGS. 1, 2, and 3.

Note that the direction of an optical axis 11a of an optical fiber 11 will be referred to as a Z-axis direction, the direction perpendicular to the Z-axis direction as an X-axis direction, and the direction perpendicular to the Z-axis directions and X-axis directions as a Y-axis direction hereinafter. Note that the Z-axis direction is the direction of laser beam emit in which a laser beam passes through the optical fiber 11 and a phosphor 31 (wavelength conversion member 33). Note that optical coupling indicates coupling of the optical fiber 11 and the wavelength conversion member 33 after the positions of an optical fiber holder 10 and a wavelength conversion member holder 30 are adjusted to make the optical axis 11a of the optical fiber 11 match an optical axis 33a of the wavelength conversion member 33.

As shown in FIG. 1, an optical coupling device 1 includes the optical fiber holder 10 that holds the optical fiber 11 capable of passing the laser beam, the wavelength conversion member holder 30 that holds the wavelength conversion member 33, and an adhesive 50 serving as a bonding material that intervenes between the optical fiber holder 10 and the wavelength conversion member holder 30 to bond them by hardening after they are relatively adjusted in position, thereby optically coupling the optical fiber 11 with the wavelength conversion member 33.

Figure 3:
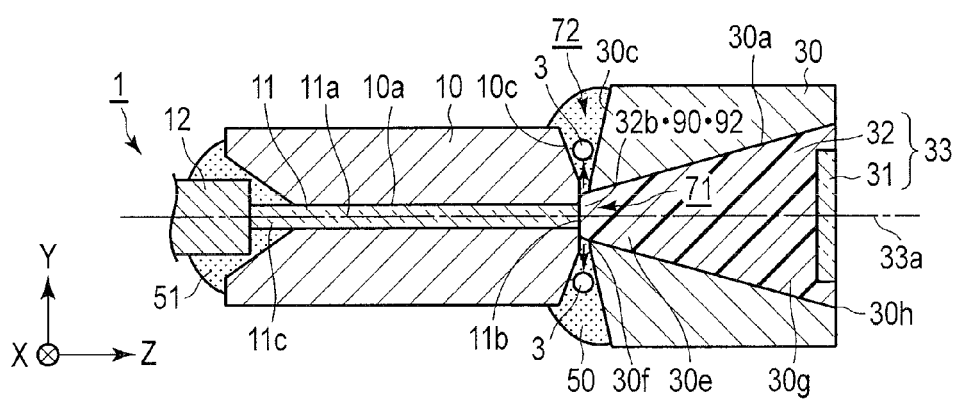
FIG. 3 is a view showing the assembled optical coupling device shown in FIGS. 1 and 2.

As shown in FIG. 3, the optical coupling device 1 has regions 71 and 72. The region 71 is formed on an end face 11b of the optical fiber 11 and an end face 32b of the wavelength conversion member 33, which are optically coupled, when bonding the optical fiber holder 10 and the wavelength conversion member holder 30 by the adhesive 50. In the region 71, foreign bodies 3 that shield the laser beam that has passed through the optical fiber 11 and enters the wavelength conversion member 33 are removed from the optical axis 11a of the optical fiber 11 and the optical axis 33a of the wavelength conversion member 33. The region 72 is formed outside the region 71 when bonding the optical fiber holder 10 and the wavelength conversion member holder 30 by the adhesive 50. In the region 72, the foreign bodies 3 removed from the region 71 flow.

The optical fiber holder 10 is made of one of, for example, ceramic and stainless steel. To hold the optical fiber 11, the optical fiber holder 10 (ferrule) has a hole 10a for receiving the optical fiber 11. The diameter of the hole 10a is almost the same as that of the optical fiber 11. The optical fiber 11 fits in or adheres to the hole 10a so that the optical fiber holder 10 holds the optical fiber 11. The optical fiber holder 10 has the holes 10a as many as the optical fibers 11. One optical fiber 11 fits in or adheres to one hole 10a. Note that in this embodiment, one hole 10a and one optical fiber 11 are illustrated for the sake of simplicity. The number of holes 10a and the number of optical fibers 11 are not particularly limited as far as they are equal in number.

A jacket 12 covers a proximal end portion 11c of the optical fiber 11 projecting from the hole 10a. The jacket 12 and the proximal end portion 11c of the optical fiber 11 are adhered to the proximal end portion of the optical fiber holder 10 by, for example, an adhesive 51.

The wavelength conversion member 33 includes the phosphor 31 and an optical characteristic matching member 32. The wavelength conversion member 33 converts the wavelength of the laser beam that has passed through the optical fiber 11 and enters the wavelength conversion member 33 into a desired wavelength.

When being irradiated with the laser beam that has emitted from the optical fiber 11, the phosphor 31 excites light in the desired wavelength. The optical characteristic matching member 32 matches the optical characteristics (for example, the refractive index) of the phosphor 31 to desired optical characteristics. The optical characteristic matching member 32 is, for example, a transparent silicone resin member. The transmittance index and refractive index of the optical characteristic matching member 32 for the lacer beam are approximate to those of the optical fiber 11 for the laser beam. The optical characteristic matching member 32 holds a desired interval between the optical fiber 11 and the phosphor 31. In this embodiment, the optical characteristic matching member 32 and the phosphor 31 are discrete members.

The wavelength conversion member holder 30 is made of one of, for example, brass, ceramic, and stainless steel. The wavelength conversion member holder 30 has a hollow portion 30a in, for example, a truncated conical shape that increases the diameter in the direction of laser beam emit (propagation). The wavelength conversion member holder 30 has the phosphor 31 at a desired position in the hollow portion 30a, for example, at the position farthest from the optical fiber holder 10 (flat end face 10c). The hollow portion 30a is disposed on the optical axis 33a of the wavelength conversion member 33 so as to extend through the wavelength conversion member holder 30.

The optical characteristic matching member 32 is buried in the hollow portion 30a. In this case, the optical characteristic matching member 32 is fixed in the wavelength conversion member holder 30 (hollow portion 30a) by an adhesive (not shown). The adhesive is poured from a portion other than an opening 30f (the side of the end face 32b to be described later) on the side of a distal end portion 30e of the hollow portion 30a, for example, an opening 30h on the side of a proximal end portion 30g of the hollow portion 30a and hardened. The adhesive thus adhesively fixes the optical characteristic matching member 32 to the wavelength conversion member holder 30.

Figure 2:
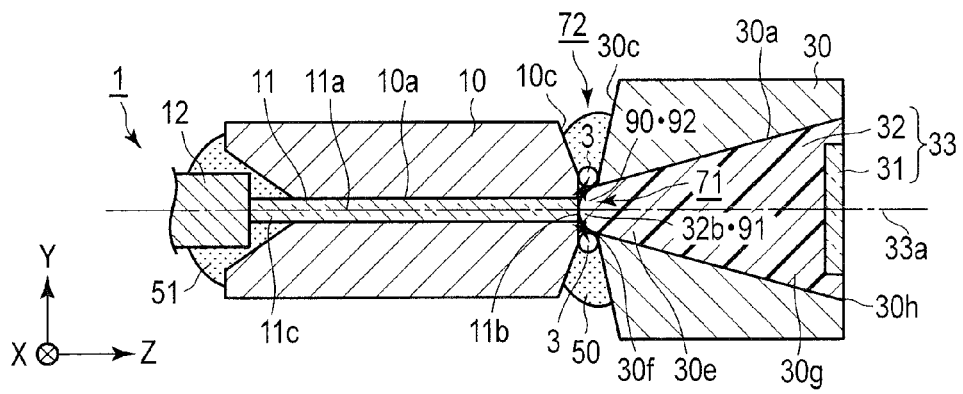
FIG. 2 is a view showing assembling the optical coupling device shown in FIG. 1.

As shown in FIGS. 1, 2, and 3, the optical fiber holder 10 and the wavelength conversion member holder 30 respectively have the end faces 10c and 30c facing each other. That is, the optical fiber holder 10 has the end face 10c facing the end face 30c of the wavelength conversion member holder 30. In addition, the wavelength conversion member holder 30 has the end face 30c facing the end face 10c of the optical fiber holder 10. At least one of the end faces 10c and 30c is tapered to squeeze the foreign bodies 3 out from between the end face 11b and a projecting portion 90 to be described later toward the end faces 10c and 30c and also to ensure large adhesive surfaces for the adhesive 50. The end faces 10c and 30c are, for example, flat.

Note that the end faces 10c and 30c are included in the region 72. The end face 10c does not include the end face 11b of the optical fiber 11. The end face 30c does not include the end face 32b of the optical characteristic matching member 32.

The relationship between the optical fiber 11 and the optical characteristic matching member 32 will be described next.

As shown in FIG. 1, the optical fiber 11 and the optical characteristic matching member 32 respectively have the end faces 11b and 32b facing each other. That is, the optical fiber 11 has the end face 11b facing the end face 32b of the optical characteristic matching member 32. The optical characteristic matching member 32 has the end face 32b facing the end face 11b of the optical fiber 11. The end face 11b is arranged on the optical axis 11a of the optical fiber 11, whereas the end face 32b is arranged on the optical axis 33a of the wavelength conversion member 33. The end face 32b also serves as the end face of the wavelength conversion member 33. At least one of the end faces 11b and 32b is formed as the projecting portion 90 that projects toward the other. The projecting portion 90 is arranged on the optical axis 11a of the optical fiber 11 and the optical axis 33a of the wavelength conversion member 33, as shown in FIGS. 1, 2, and 3.

For example, the end face 32b is formed as the projecting portion 90 that projects from the opening 30f toward the end face 10c so as to jut from the end face 30c, as shown in FIGS. 1, 2, and 3. In this case, the end face 32b (projecting portion 90) is part of the optical characteristic matching member 32 jutting from the end face 30c, and is integrated with the optical characteristic matching member 32. The end face 32b is transparent resin member. An apex 91 of the projecting portion 90 is arranged on the optical axis 33a of the wavelength conversion member 33. The projecting portion 90 projects from the opening 30f.

Alternatively, for example, as shown in FIG. 4, the end face 11b is formed as the projecting portion 90 that projects from the distal end portion of the hole 10a toward the end face 30c so as to jut from the end face 10c. In this case, the end face 11b (projecting portion 90) is part of the optical fiber 11 jutting from the end face 10c, and is integrated with the optical fiber 11. The apex 91 of the projecting portion 90 is arranged on the optical axis 11a of the optical fiber 11.

As described above, the projecting portion 90 is formed on the end face 32b of the optical characteristic matching member 32 as part of the wavelength conversion member 33 so as to jut from the end face 30c of the wavelength conversion member holder 30 and/or formed on the end face 11b of the optical fiber 11 so as to jut from the end face 10c of the optical fiber holder 10.

Note that in this embodiment, the end face 32b is formed as the projecting portion 90, as shown in FIGS. 1, 2, and 3. In this case, the end face 11b is flat. The end faces 11b and 32b and the projecting portion 90 are included in the region 71.

Note that before the adhesive 50 bonds the optical fiber holder 10 and the wavelength conversion member holder 30, the foreign bodies 3 that shield the laser beam remain between the projecting portion 90 and the end face 11b in the Z-axis direction and, more specifically, on the optical axis 11a of the optical fiber 11 and the optical axis 33a of the wavelength conversion member 33 between the projecting portion 90 and the end face 11b. The foreign bodies 3 remain without being removed upon assembling the optical coupling device 1. The foreign bodies 3 are, for example, chips resulted from at least one of the optical fiber 11 and the wavelength conversion member 33 rubbed against each other when being optically coupled. Note that when the projecting portions 90 are formed on the end faces 11b and 32b, the foreign bodies 3 remain between the projecting portions 90. When the projecting portion 90 is formed on the end face 11b, the foreign bodies 3 remain on the optical axis 11a of the optical fiber 11 and the optical axis 33a of the wavelength conversion member 33 between the projecting portion 90 and the end face 32b.

When bonding the optical fiber holder 10 and the wavelength conversion member holder 30, the projecting portion 90 pushes the end face 11b or is pushed by the end face 11b, as shown in, for example, FIG. 2, along the optical axis 11a of the optical fiber 11 and the optical axis 33a of the wavelength conversion member 33. The projecting portion 90 thus removes the foreign bodies 3 on the optical axis 11a of the optical fiber 11 and the optical axis 33a of the wavelength conversion member 33 from there, and forms the regions 71 and 72 when bonding the optical fiber holder 10 and the wavelength conversion member holder 30, as shown in FIGS. 2 and 3.

Note that a distal end portion 92 of the projecting portion 90 including the end face 32b curves. For this reason, when the projecting portion 90 including the distal end portion 92 pushes or is pushed, the distal end portion 92 deforms to spread outward (toward the side of the end faces 10c and 30c) from the optical axis 11a of the optical fiber 11 and the optical axis 33a of the wavelength conversion member 33, as shown in FIG. 2. The distal end portion 92 presses, for example, the end face 11b so as to deform from the curved surface into a flat surface like the end face 11b and thus come into tight contact with the end face 11b.

When the distal end portion 92 spreads toward the side of the end faces 10c and 30c upon deformation, the projecting portion 90 squeezes the foreign bodies 3 out from the optical axis 11a of the optical fiber 11 and the optical axis 33a of the wavelength conversion member 33 toward the side of the end faces 10c and 30c, thereby removing the foreign bodies 3 from between the projecting portion 90 and the end face 11b in the Z-axis direction, as shown in FIG. 2. At the same time, the projecting portion 90 forms the regions 71 and 72, as shown in FIG. 3.

Note that when the end face 11b is formed as the projecting portion 90, as shown in FIG. 4, the projecting portion 90 has the acute distal end portion 92 on which the foreign bodies 3 slide when pushing or being pushed. The projecting portion 90 makes the foreign bodies 3 slide over the acute distal end portion 92 so as to squeeze the foreign bodies 3 out from the optical axis 11a of the optical fiber 11 and the optical axis 33a of the wavelength conversion member 33 toward the side of the end faces 10c and 30c, thereby removing the foreign bodies 3 from between the projecting portion 90 and the end face 32b in the Z-axis direction. At the same time, the projecting portion 90 forms the regions 71 and 72. Note that the distal end portion 92 need not always be acute and need only have a desired angle with respect to the optical axis 11a as far as the foreign bodies 3 can slide.

The adhesive 50 is a UV hardening epoxy resin hardened when irradiated with UV light. The adhesive 50 intervenes between the end face 10c including the end face 11b and the end face 30c including the projecting portion 90 and is hardened when irradiated with UV light after active alignment (the optical fiber holder 10 and the wavelength conversion member holder 30 are adjusted to desired relative positions, and the optical fiber 11 is optically coupled with the phosphor 31). By hardening, the adhesive 50 adheres the end face 10c to the end face 30c and bonds the optical fiber holder 10 to the wavelength conversion member holder 30. Hence, the end faces 10c and 30c are bonded surfaces (adhesive surfaces).

The transmittance index and refractive index of the adhesive 50 for the laser beam are approximate to those of the optical fiber 11 for the laser beam.

The adhesive 50 before hardening assists by its viscosity and the like the projecting portion 90 in squeezing the foreign bodies 3 out.

Note that the above-described region 71 also serves as the space where the optical fiber 11 is optically coupled with the phosphor 31 in a state in which the foreign bodies 3 have been removed from between the projecting portion 90 and the end face 11b in the Z-axis direction (the optical axis 11a of the optical fiber 11 and the optical axis 33a of the wavelength conversion member 33).

The above-described region 72 is the space ensured (formed) outside the region 71, that is, on the sides of the end faces 10c and 30c to make the foreign bodies 3 removed (squeezed out) from the region 71 remain.

A method of implementing the optical coupling device 1 according to this embodiment will be described next.

As shown in FIG. 1, in a state in which the phosphor 31 is disposed in the hollow portion 30a, the optical characteristic matching member 32 is fixed in the wavelength conversion member holder 30 (hollow portion 30a) by an adhesive. At this time, the projecting portion 90 (end face 32b) projects from the opening 30f toward the end face 10c so as to jut from the end face 30c. The apex 91 is arranged on the optical axis 33a of the wavelength conversion member 33. The adhesive is poured from, for example, the opening 30h on the side of the proximal end portion 30g of the hollow portion 30a and hardened (Step 1).

The adhesive 50 is applied to the end face 10c including the end face 11b, as shown in FIG. 1 (Step 2).

The optical fiber holder 10 and the wavelength conversion member holder 30 are disposed on fixing jigs (not shown), respectively (Step 3).

The laser beam is emitted by a light source (not shown) and passes through the optical fiber 11. The laser beam that has passed through the optical fiber 11 enters the wavelength conversion member holder 30 and irradiates the phosphor 31 through the optical characteristic matching member 32. The phosphor 31 irradiated with the laser beam excites light in the desired wavelength (Step 4).

The light amount of the laser beam on the phosphor 31 is measured by a measuring unit (not shown) (Step 5).

Note that in Steps 1 to 5, since the optical characteristic matching member 32 holds a desired interval between the optical fiber 11 and the phosphor 31, the optical fiber 11 irradiates the phosphor 31 with light in a desired amount so that a desired light amount is ensured from the phosphor 31.

One of the optical fiber holder 10 and the wavelength conversion member holder 30 is fixed in position by the fixing jig (Step 6). Assume that the optical fiber holder 10 is fixed hereinafter.

The fixing jig adjusts the position of the wavelength conversion member holder 30 relative to the optical fiber holder 10 such that the optical axis 11a of the optical fiber 11 and the optical axis 33a of the wavelength conversion member 33 are arranged in a straight line, as shown in FIG. 1, and the light amount of the laser beam measured by the measuring unit is maximized (Step 7, position adjusting step).

Note that at this time, the foreign bodies 3 that shield the laser beam remain between the projecting portion 90 and the end face 11b in the Z-axis direction and, more specifically, on the optical axis 11a of the optical fiber 11 and the optical axis 33a of the wavelength conversion member 33, as shown in FIG. 1.

The wavelength conversion member holder 30 moves toward the optical fiber holder 10 by the fixing jig so as to press it and, for example, cause the projecting portion 90 to push the end face 11b, as shown in FIG. 2 (Step 8, pressing step).

The distal end portion 92 (end face 32b) of the projecting portion 90 presses the end face 11b and thus deforms from the curved surface into a flat surface like the end face 11b (Step 9).

The distal end portion 92 (end face 32b) deforms to spread toward the side of the end faces 10c and 30c. Accordingly, the projecting portion 90 squeezes the foreign bodies 3 out from between the projecting portion 90 and the end face 11b in the Z-axis direction toward the side of the end faces 10c and 30c, thereby removing the foreign bodies 3 from between the projecting portion 90 and the end face 11b (Step 10).

In Steps 9 and 10, the distal end portion 92 (end face 32b) presses the end face 11b so as to deform into a flat surface like the end face 11b and thus come into tight contact with the end face 11b, as shown in FIG. 3. In addition, since the apex 91 is arranged on the optical axis 33a of the wavelength conversion member 33, the distal end portion 92 uniformly spreads from the optical axis 33a toward the side of the end faces 10c and 30c to unevenly squeeze the foreign bodies 3 out in Steps 9 and 10.

Since the end faces 10c and 30c are tapered, the foreign bodies 3 are removed along the tapers in Step 10. At this time, the adhesive 50 before hardening assists by its viscosity and the like the distal end portion 92 in squeezing the foreign bodies 3 out.

At the same time as Step 10, the region 71 is formed by the press where the foreign bodies 3 have been removed from between the projecting portion 90 and the end face 11b in the Z-axis direction, as shown in FIGS. 2 and 3. That is, when bonding the optical fiber holder 10 and the wavelength conversion member holder 30, the region 71 serving as the space where the optical fiber 11 is optically coupled with the phosphor 31 is ensured (formed) by the projecting portion 90 between the end face 11b and the projecting portion 90 (end face 32b) in the Z-axis direction. The region 71 is ensured in a state in which the foreign bodies 3 that shield the laser beam have been removed from between the projecting portion 90 and the end face 11b in the Z-axis direction (Step 11, region 71 forming step).

Additionally, at the same time as Steps 10 and 11, the region 72 where the foreign bodies 3 removed from the region 71 flow is formed outside the region 71 by the press, as shown in FIGS. 2 and 3. That is, when bonding the optical fiber holder 10 and the wavelength conversion member holder 30, the region 72 serving as the space where the foreign bodies 3 removed (squeezed out) from the region 71 remain is ensured (formed) outside the region 71, that is, on the sides of the end faces 10c and 30c (Step 12, region 72 forming step).

In this state, the adhesive 50 is irradiated for a desired time with UV light emitted by a UV irradiation apparatus (not shown) so as to be hardened and bond the optical fiber holder 10 and the wavelength conversion member holder 30, as shown in FIG. 3. Note that since the end faces 10c and 30c are tapered, the adhesive 50 adheres to the optical fiber holder 10 and the wavelength conversion member holder 30 in a larger amount than when the end faces 10c and 30c are formed flat (Step 13).

With the above-described operation, the relative positions of the optical fiber holder 10 and the wavelength conversion member holder 30 are adjusted, the optical axis 11a of the optical fiber 11 and the optical axis 33a of the wavelength conversion member 33 are arranged in a straight line, and the foreign bodies 3 are removed. In this state, the optical fiber holder 10 is bonded to the wavelength conversion member holder 30 by the adhesive 50, the optical fiber 11 is optically coupled with the phosphor 31, and the active alignment ends. The optical coupling device 1 is thus implemented.

As described above, in this embodiment, when bonding the optical fiber holder 10 and the wavelength conversion member holder 30, the regions 71 and 72 are ensured (formed), thereby suppressing the light amount loss. Note that the region 71 serves as the space where the optical fiber 11 is optically coupled with the phosphor 31 in a state in which the foreign bodies 3 have been removed from between the projecting portion 90 and the end face 11b in the Z-axis direction (the optical axis 11a of the optical fiber 11 and the optical axis 33a of the wavelength conversion member 33 between the projecting portion 90 and the end face 11b). The region 72 serves as the space where the foreign bodies 3 removed (squeezed out) from the region 71 remain.

In this embodiment, when bonding the optical fiber holder 10 and the wavelength conversion member holder 30, the deformable projecting portion 90 (distal end portion 92) and the end face 11b can press each other to squeeze the foreign bodies 3 between the projecting portion 90 and the end face 11b in the Z-axis direction out toward the side of the end faces 10c and 30c. In this embodiment, it is therefore possible to efficiently remove the foreign bodies 3 remaining between the projecting portion 90 and the end face 11b in the Z-axis direction from between the projecting portion 90 and the end face 11b in the Z-axis direction without any damage to the end face 11b and thus form the regions 71 and 72 at the time of implementation.

In this embodiment, the projecting portion 90 deforms to spread toward the side of the end faces 10c and 30c. This enables to easily squeeze the foreign bodies 3 out and remove them from between the projecting portion 90 and the end face 11b in the Z-axis direction.

In this embodiment, forming the acute distal end portion 92 as shown in FIG. 4 also allows to easily squeeze the foreign bodies 3 out and remove them from between the projecting portion 90 and the end face 11b in the Z-axis direction. Note that in this case, the end face 32b is made of a silicone resin and can therefore be prevented from being damaged by the acute distal end portion 92.

In this embodiment, since the optical characteristic matching member 32 can hold a desired interval between the optical fiber 11 and the phosphor 31, the optical fiber 11 can irradiate the phosphor 31 with light in a desired amount so that a desired light amount can be ensured from the phosphor 31.

In this embodiment, the distal end portion 92 (end face 32b) can press the end face 11b so as to deform into a flat surface like the end face 11b and thus come into tight contact with the end face 11b to remove the foreign bodies 3. In this embodiment, it is therefore possible to prevent laser beam leakage from between the end face 11b and the distal end portion 92 and suppress the light amount loss.

In this embodiment, at least one of the end faces 10c and 30c is tapered. This makes it possible to easily remove the foreign bodies 3 and ensure large adhesive surfaces for the adhesive 50 on the optical fiber holder 10 and the wavelength conversion member holder 30. This can consequently increase the bonding strength between the optical fiber holder 10 and the wavelength conversion member holder 30.

In this embodiment, the apex 91 is arranged on the optical axis 33a of the wavelength conversion member 33. This allows to uniformly spread the distal end portion 92 from the optical axis 33a toward the side of the end faces 10c and 30c and easily unevenly squeeze the foreign bodies 3 out toward the side of the end faces 10c and 30c.

In this embodiment, the foreign bodies 3 can easily be squeezed out toward the side of the end faces 10c and 30c by the adhesive 50.

Note that in this embodiment, the adhesive 50 is hardened by UV light. However, it may be hardened by heat. In this case, the optical coupling device 1 is disposed in a heated atmosphere to harden the adhesive 50 and bond the optical fiber holder 10 and the wavelength conversion member holder 30.

In this embodiment, the phosphor 31 and the optical characteristic matching member 32 are discrete members. However, the present invention is not limited to this. The phosphor 31 may have the components of the optical characteristic matching member 32, as shown in FIG. 5. In this case, the distal end portion of the phosphor 31 serves as the projecting portion 90, and the projecting portion 90 forms part of the phosphor 31.

In this embodiment, a foreign body flow promoting member 93 may intervene between the optical fiber holder 10 and the wavelength conversion member holder 30, as shown in FIGS. 6A, 6B, and 6C. The foreign body flow promoting member 93 helps the projecting portion 90 in squeezing the foreign bodies 3 out from between the projecting portion 90 and the end face 11b in the Z-axis direction toward the side of the end faces 10c and 30c and also helps the foreign bodies 3 in flowing from the optical axis 11a of the optical fiber 11 and the optical axis 33a of the wavelength conversion member 33 toward the side of the end faces 10c and 30c. More specifically, the foreign body flow promoting member 93 helps the projecting portion 90 in squeezing the foreign bodies 3 out from the optical axis 11a of the optical fiber 11 and the optical axis 33a of the wavelength conversion member 33 between the projecting portion 90 and the end face 11b toward the side of the end faces 10c and 30c and also helps the foreign bodies 3 in flowing from the optical axis 11a of the optical fiber 11 and the optical axis 33a of the wavelength conversion member 33 toward the side of the end faces 10c and 30c. The foreign body flow promoting member 93 bonds the optical fiber holder 10 and the wavelength conversion member holder 30. To promote flow of the foreign bodies 3, the foreign body flow promoting member 93 is disposed at least between the projecting portion 90 and the end face 11b in the Z-axis direction. More specifically, the foreign body flow promoting member 93 is disposed on the optical axis 11a of the optical fiber 11 and the optical axis 33a of the wavelength conversion member 33 between the projecting portion 90 and the end face 11b.

In this embodiment, the adhesive 50 is disposed to cover the foreign body flow promoting member 93, as shown in FIG. 6C. The viscosity of the foreign body flow promoting member 93 is lower than that of the adhesive 50. The transmittance index and refractive index of the foreign body flow promoting member 93 for the laser beam are approximate to those of the optical fiber 11 and the phosphor 31 for the laser beam. The foreign body flow promoting member 93 is, for example, matching oil.

As described above, in this embodiment, the foreign bodies 3 can easily be squeezed out and removed by the foreign body flow promoting member 93 from between the projecting portion 90 and the end face 11b in the Z-axis direction toward the side of the end faces 10c and 30c, the regions 71 and 72 can easily be ensured, and the light amount loss can further be suppressed.

The second embodiment of the present invention will be described next with reference to FIGS. 7 and 8. Note that the same reference numerals as in the first embodiment denote the same parts in the second embodiment, and a description thereof will be omitted.

At least one of end faces 10c and 30c of this embodiment has a groove 30j capable of accommodating foreign bodies 3. A wall surface 30k of the groove 30j, which is disposed on the side of a region 71 (optical axes 11a and 33a), is tapered. The grooves 30j in the end faces 10c and 30c may be disposed with shifts in the X- and Y-axis directions or on a straight line in the Z-axis direction.

In this embodiment, disposing the groove 30j in a region 72 enables to accommodate the foreign bodies 3 and more reliably remove them. Hence, in this embodiment, it is possible to more efficiently remove the foreign bodies 3 remaining between a projecting portion 90 and an end face 11b in the Z-axis direction, easily ensure the regions 71 and 72, and further suppress the light amount loss at the time of implementation.

In this embodiment, disposing the tapered wall surface 30k in the groove 30j allows to more easily accommodate the foreign bodies 3 in the groove 30j.

The third embodiment of the present invention will be described next with reference to FIG. 9. Note that the same reference numerals as in the first embodiment denote the same parts in the third embodiment, and a description thereof will be omitted.

End faces 11b and 32b of this embodiment are flat without a projecting portion 90. An intermediate member 95 intervenes between the end face 11b and the end face 32b of this embodiment so as to be arranged on an optical axis 11a of an optical fiber 11 and an optical axis 33a of a wavelength conversion member 33. When bonding an optical fiber holder 10 and a wavelength conversion member holder 30, the intermediate member 95 can deform to spread outward from the optical axis 11a of the optical fiber 11 and the optical axis 33a of the wavelength conversion member 33 upon being pressed. When deforming, the intermediate member 95 removes foreign bodies 3 by squeezing them out from between the projecting portion 90 and the end face 11b in the Z-axis direction toward the side of the end faces 10c and 30c and forms regions 71 and 72. More specifically, when deforming, the intermediate member 95 removes the foreign bodies 3 by squeezing them out from the optical axis 11a of the optical fiber 11 and the optical axis 33a of the wavelength conversion member 33 between the projecting portion 90 and the end face 11b toward the side of the end faces 10c and 30c and forms the regions 71 and 72.

To prevent any damage to the end faces 11b and 32b, the intermediate member 95 has curved surfaces abutting against them. The intermediate member 95 is made of, for example, a transparent silicone resin. The transmittance index and refractive index of the intermediate member 95 for the laser beam are approximate to those of the optical fiber 11 for the laser beam.

In this embodiment, even if both the optical fiber 11 and the wavelength conversion member 33 (the end faces 11b and 32b) are hard members like glass members, the intermediate member 95 can remove the foreign bodies 3 without damaging the optical fiber 11 and the wavelength conversion member 33 and suppress the light amount loss.

The present invention is not exactly limited to the above embodiments, and constituent elements can be modified in the stage of practice without departing from the spirit and scope of the invention. Various inventions can be formed by properly combining a plurality of constituent elements disclosed in the above embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical coupling device comprising:
an optical fiber holder configured to hold an optical fiber;
a wavelength conversion member including a phosphor and an optical characteristic matching member that matches optical characteristics of the phosphor to desired optical characteristics and configured to convert a wavelength of a laser beam that has passed through the optical fiber and enters the wavelength conversion member into a desired wavelength;
a wavelength conversion member holder configured to hold the wavelength conversion member, and to bond the optical fiber holder so as to the optical fiber and the wavelength conversion member are optically couple each other,
a first region which is formed on an end face of the optical fiber and an end face of the wavelength conversion member, which are optically coupled, when bonding the optical fiber holder and the wavelength conversion member holder, and in which foreign bodies that shield the laser beam are removed from an optical axis of the optical fiber and an optical axis of the wavelength conversion member; and
a second region which is formed outside the first region when bonding the optical fiber holder and the wavelength conversion member holder, and in which the foreign bodies removed from the first region flow.

2. The device according to claim 1, further comprising a bonding material intervening between the optical fiber holder and the wavelength conversion member holder to bond the optical fiber holder and the wavelength conversion member holder by hardening after the optical fiber holder and the wavelength conversion member holder are relatively adjusted in position, thereby optically coupling the optical fiber with the wavelength conversion member.

3. The device according to claim 2, further comprising a projecting portion arranged on the optical axis of the optical fiber and the optical axis of the wavelength conversion member and configured, when bonding the optical fiber holder and the wavelength conversion member holder, to push or be pushed along the optical axis of the optical fiber and the optical axis of the wavelength conversion member so as to remove the foreign bodies on the optical axis of the optical fiber and the optical axis of the wavelength conversion member from the optical axis of the optical fiber and the optical axis of the wavelength conversion member and form the first region and the second region.

4. The device according to claim 3, wherein the projecting portion is formed on the end face of the wavelength conversion member so as to jut from an end face of the wavelength conversion member holder and/or formed on the end face of the optical fiber so as to jut from an end face of the optical fiber holder.

5. The device according to claim 4, wherein a distal end portion of the projecting portion has a curved surface and deforms to spread outward from the optical axis of the optical fiber and the optical axis of the wavelength conversion member when the projecting portion including the distal end portion pushes or is pushed.

6. The device according to claim 4, wherein the projecting portion has an acute distal end portion on which the foreign bodies slide when pushing or being pushed.

7. The device according to claim 3, wherein the optical characteristic matching member holds a desired interval between the optical fiber and the phosphor.

8. The device according to claim 3, wherein
the optical fiber holder and the wavelength conversion member holder have end faces facing each other, and
at least one of the end face of the optical fiber holder and the end face of the wavelength conversion member holder is tapered.

9. The device according to claim 3, further comprising a foreign body flow promoting member intervening at least between the end face of the optical fiber holder and the end face of the wavelength conversion member holder to help the projecting portion in squeezing the foreign bodies out from the optical axis of the optical fiber and the optical axis of the wavelength conversion member.

10. The device according to claim 3, wherein
the optical fiber holder and the wavelength conversion member holder have end faces facing each other, and
at least one of the end face of the optical fiber holder and the end face of the wavelength conversion member holder has a groove.

11. The device according to claim 2, further comprising an intermediate member intervening between the end face of the optical fiber and the end face of the wavelength conversion member so as to be arranged on the optical axis of the optical fiber and the optical axis of the wavelength conversion member, and configured, when bonding the optical fiber holder and the wavelength conversion member holder, to deform to spread outward from the optical axis of the optical fiber and the optical axis of the wavelength conversion member upon being pressed and, upon deforming, remove the foreign bodies on the optical axis of the optical fiber and the optical axis of the wavelength conversion member from the optical axis of the optical fiber and the optical axis of the wavelength conversion member and form the first region and the second region.

12. The device according to claim 11, wherein the optical characteristic matching member holds a desired interval between the optical fiber and the phosphor.

13. The device according to claim 12, wherein
the optical fiber holder and the wavelength conversion member holder have end faces facing each other, and
at least one of the end face of the optical fiber holder and the end face of the wavelength conversion member holder is tapered.

14. The device according to claim 13, further comprising a foreign body flow promoting member intervening at least between the end face of the optical fiber holder and the end face of the wavelength conversion member holder to help the projecting portion in squeezing the foreign bodies out from the optical axis of the optical fiber and the optical axis of the wavelength conversion member.

15. The device according to claim 14, wherein
the optical fiber holder and the wavelength conversion member holder have end faces facing each other, and
at least one of the end face of the optical fiber holder and the end face of the wavelength conversion member holder has a groove.

16. A method of implementing an optical coupling device which includes:
an optical fiber holder configured to hold an optical fiber;
a wavelength conversion member including a phosphor and an optical characteristic matching member that matches optical characteristics of the phosphor to desired optical characteristics and configured to convert a wavelength of a laser beam that has passed through the optical fiber and enters the wavelength conversion member into a desired wavelength; and
a wavelength conversion member holder configured to hold the wavelength conversion member, and
optically couples the optical fiber with the wavelength conversion member when bonding the optical fiber holder and the wavelength conversion member holder, the method comprising:
relatively adjusting the wavelength conversion member holder and the optical fiber holder in position so as to arrange an optical axis of the optical fiber and an optical axis of the wavelength conversion member in a straight line;
pressing one of the optical fiber holder and the wavelength conversion member holder against the other so as to push one of an end face of the optical fiber and an end face of the wavelength conversion member against the other;
forming a first region by the pressing, where foreign bodies that shield the laser beam are removed from the optical axis of the optical fiber and the optical axis of the wavelength conversion member; and
forming a second region by the pressing, where the foreign bodies removed from the first region flow.

* * * * *